(12) United States Patent
Suzuki et al.

(10) Patent No.: US 11,156,406 B2
(45) Date of Patent: Oct. 26, 2021

(54) HEAT EXCHANGER (71) Applicant: DENSO CORPORATION, Kariya (JP)

(72) Inventors: Kazutaka Suzuki, Kariya (JP); Taichi Asano, Kariya (JP)

(73) Assignee: DENSO CORPORATION, Kariya (JP)

(*) Notice: Subject to any disclaimer, the term of this patent is extended or adjusted under 35 U.S.C. 154(b) by 167 days.

(21) Appl. No.: 16/535,978

(22) Filed: Aug. 8, 2019

(65) Prior Publication Data
US 2019/0360757 A1 Nov. 28, 2019

Related U.S. Application Data (63) Continuation of application No. PCT/JP2018/005318, filed on Feb. 15, 2018.

(30) Foreign Application Priority Data

Feb. 21, 2017 (JP) ............................. JP2017-030093

(51) Int. Cl.
*F28D 9/00* (2006.01)
*F28F 3/08* (2006.01)
*F28D 21/00* (2006.01)

(52) U.S. Cl.
CPC ............. *F28D 9/0075* (2013.01); *F28F 3/08* (2013.01); *F28D 2021/0082* (2013.01); *F28F 2275/025* (2013.01)

(58) Field of Classification Search
CPC ........... F28D 2021/0082; F28D 9/0056; F28D 9/0075; F28F 3/08; F28F 2275/025
See application file for complete search history.

(56) References Cited

U.S. PATENT DOCUMENTS 3,334,399 A * 8/1967 Teeguarden .......... F28D 9/0075
29/890.039
5,409,056 A * 4/1995 Farry, Jr. ............... F28D 1/0341
165/153
(Continued)

FOREIGN PATENT DOCUMENTS

FR         2973491 A      10/2012
JP       H01106771 U       7/1989
(Continued)

*Primary Examiner* — Devon Russell
(74) *Attorney, Agent, or Firm* — Harness, Dickey & Pierce, P.L.C.

(57) ABSTRACT

A heat exchanger includes a plurality of cooling plates, a duct plate disposed around the cooling plates and a spacer plate fixed to both the duct plate and the cooling plate to prevent supercharged air from flowing into a gap between the duct plate and the cooling plate. The cooling plate includes cup portions allowing cooling water flow paths of the corresponding two cooling plates to be in communication with each other when the cooling plate is fixed to the adjacent cooling plate. The cooling water flow path formed in the cooling plate includes flow path portions and formed extending in a direction perpendicular to a flow direction of supercharged air from the corresponding cup portions. The cup portions are each formed in a tubular shape having a central axis at a position offset along the flow direction of the supercharged air from a center of the corresponding one of the flow path portions in a flow path width direction.

4 Claims, 12 Drawing Sheets

(56) References Cited

U.S. PATENT DOCUMENTS

2002/0104645 A1* 8/2002 Yoshida ................ F28D 9/0075
165/166
2006/0231241 A1* 10/2006 Papapanu ............... F28F 13/06
165/152

FOREIGN PATENT DOCUMENTS

| JP | 2011117715 A | * | 6/2011 |
| JP | 2016142509 A | | 8/2016 |
| JP | 6413814 B2 | * | 10/2018 |
| WO | WO-2013092642 A1 | | 6/2013 |

* cited by examiner

FIG. 11
COMPARATIVE EXAMPLE

FIG. 12

HEAT EXCHANGER

CROSS REFERENCE TO RELATED APPLICATIONS

This application is a continuation application of international Patent Application No. PCT/JP2018/005318 filed on Feb. 15, 2018, which designated the U.S. and claims the benefit of priority from Japanese Patent Application No. 2017-030093 filed on Feb. 21, 2017. The entire disclosure of all of the above applications are incorporated herein by reference.

TECHNICAL FIELD

The present disclosure relates to a heat exchanger that cools supercharged air of a vehicle.

BACKGROUND ART

Conventionally, a heat exchanger includes a plurality of stacked plates and a housing disposed surrounding the plates. A gap between the plates adjacent to each other constitutes a cooling fluid flow path through which a cooling fluid flows. That is, in such a conventional heat exchanger, a plurality of cooling fluid flow paths is stacked and disposed along a stacking direction of the plates. The cooling fluid flow paths communicate with each other through cylindrical cup portions formed in the corresponding plates. Such a conventional heat exchanger is configured such that heat exchange is performed between the cooling fluid flowing between the plates and supercharged air of a vehicle to cool the supercharged air.

SUMMARY OF THE INVENTION

A heat exchanger according to one aspect of the present disclosure includes a plurality of cooling plates, a duct plate and a spacer plate. The plurality of cooling plates are stacked with each other with gaps, and each of the plurality of cooling plates defines a cooling water flow path therein through which cooling water flows. The duct plate is disposed around the plurality of cooling plates, and defines an inflow opening into which supercharged air flows and an outflow opening from which the supercharged air flows out. The spacer plate is fixed to both the duct plate and the cooling plate to prevent supercharged air from flowing into a gap between the duct plate and the cooling plate. The plurality of cooling plates include a plurality of cup portions, and each of the plurality of cup portions is fixed to neighboring two of the plurality of cooling plates to cause the cooling water flow paths of the two neighboring cooling plates to be in communication with each other. The cooling water flow path of each of the plurality of cooling plates includes a flow path portion extending from a respective one of the plurality of cup portions along a direction perpendicular to a flow direction of the supercharged air. A direction perpendicular to a flow direction of the cooling water in the flow path portion is defined as a flow path width direction, and each of the plurality of cup portions is formed into a tubular shape having a central axis at a position offset along the flow direction of the supercharged air from a center of the flow path portion in the flow path width direction.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Hereinafter, an embodiment of a heat exchanger will be described with reference to the drawings. For easy understanding of description, the same component in each of the drawings is designated by the same reference numeral as far as possible without duplicated description on the component. First, an outline of an intake system of a vehicle, provided with the heat exchanger of the present embodiment, will be described.

Figure 1:
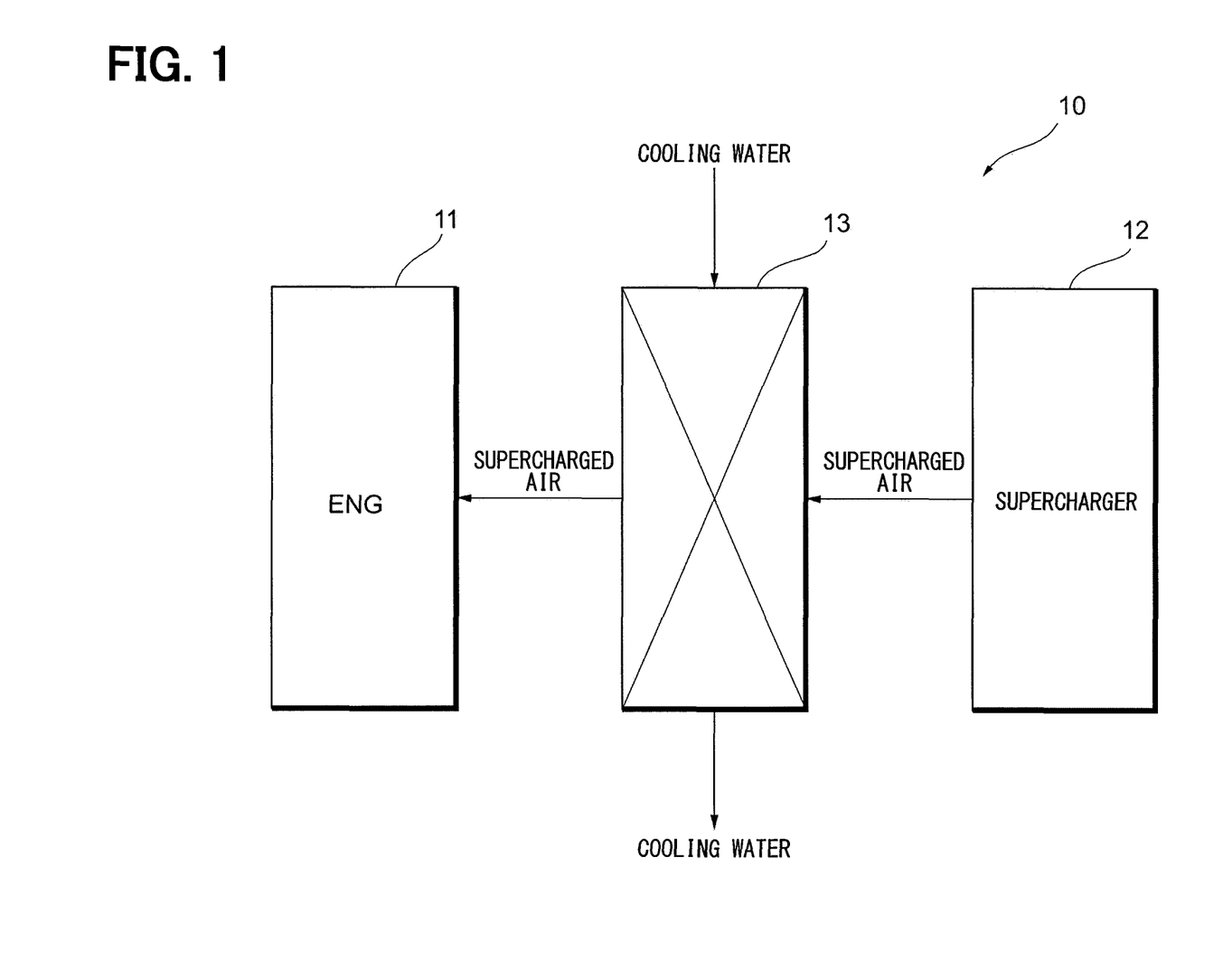
FIG. 1 is a block diagram illustrating a schematic configuration of an intake system of a vehicle.

As illustrated in FIG. 1, an intake system 10 is provided with a supercharger 12 for supercharging air taken into an engine 11. When the supercharged air is sucked into the engine 11, the maximum output of the engine 11 can be supplemented.

The intake system 10 is provided on its side downstream of the supercharger 12 in intake airflow with a heat exchanger 13. The heat exchanger 13 performs heat exchange between air supercharged by the supercharger 12 and cooling water to cool the supercharged air and supply it to the engine 11. As a result, charging efficiency of air supplied to the engine 11 is increased to enable output of the engine 11 to be increased.

Next, structure of the heat exchanger 13 will be specifically described.

Figure 2:
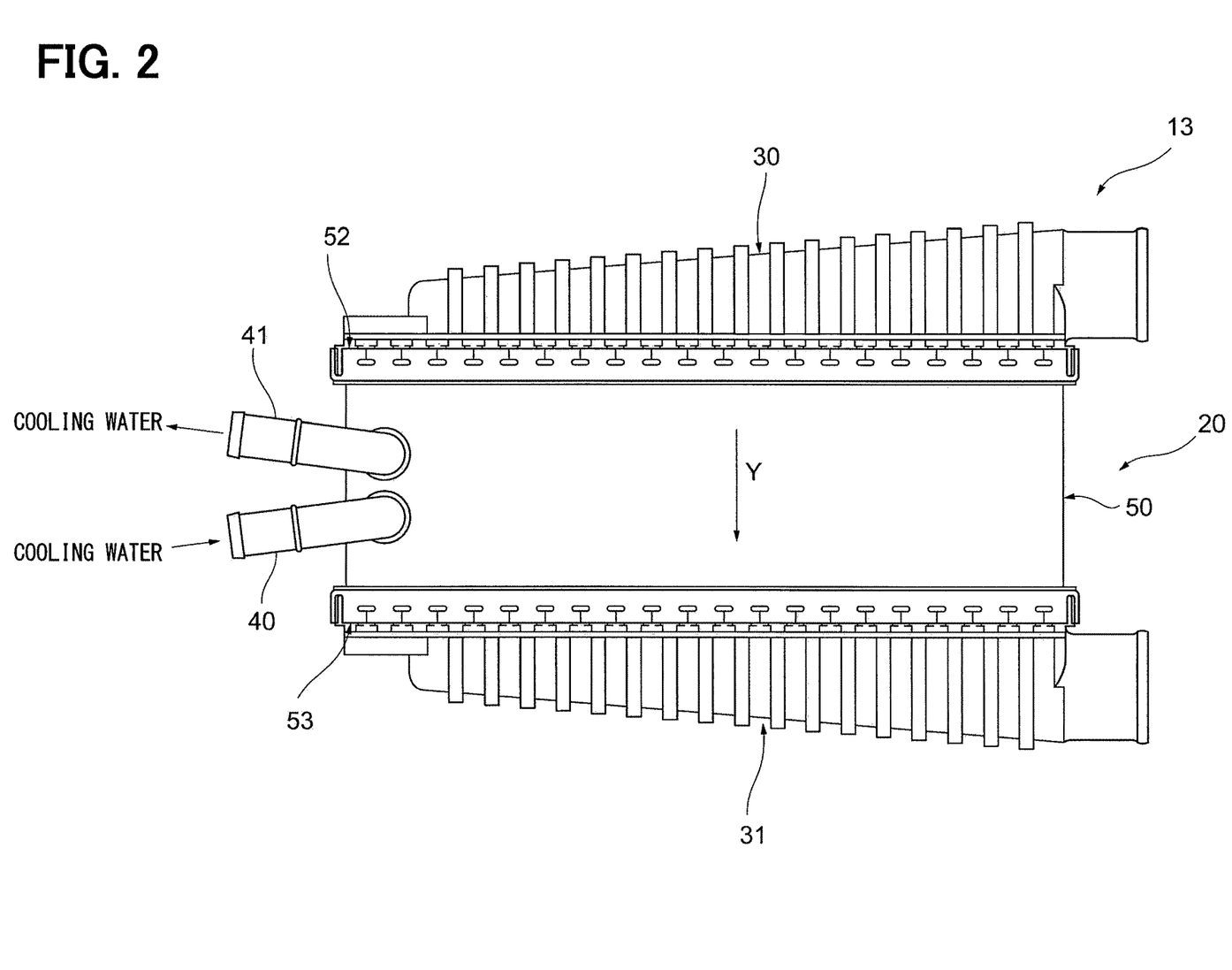
FIG. 2 is a plan view illustrating a planar structure of a heat exchanger of an embodiment.

As illustrated in FIG. 2, the heat exchanger 13 includes a heat exchange unit 20, tanks 30 and 31, and pipes 40 and 41.

Figure 3:
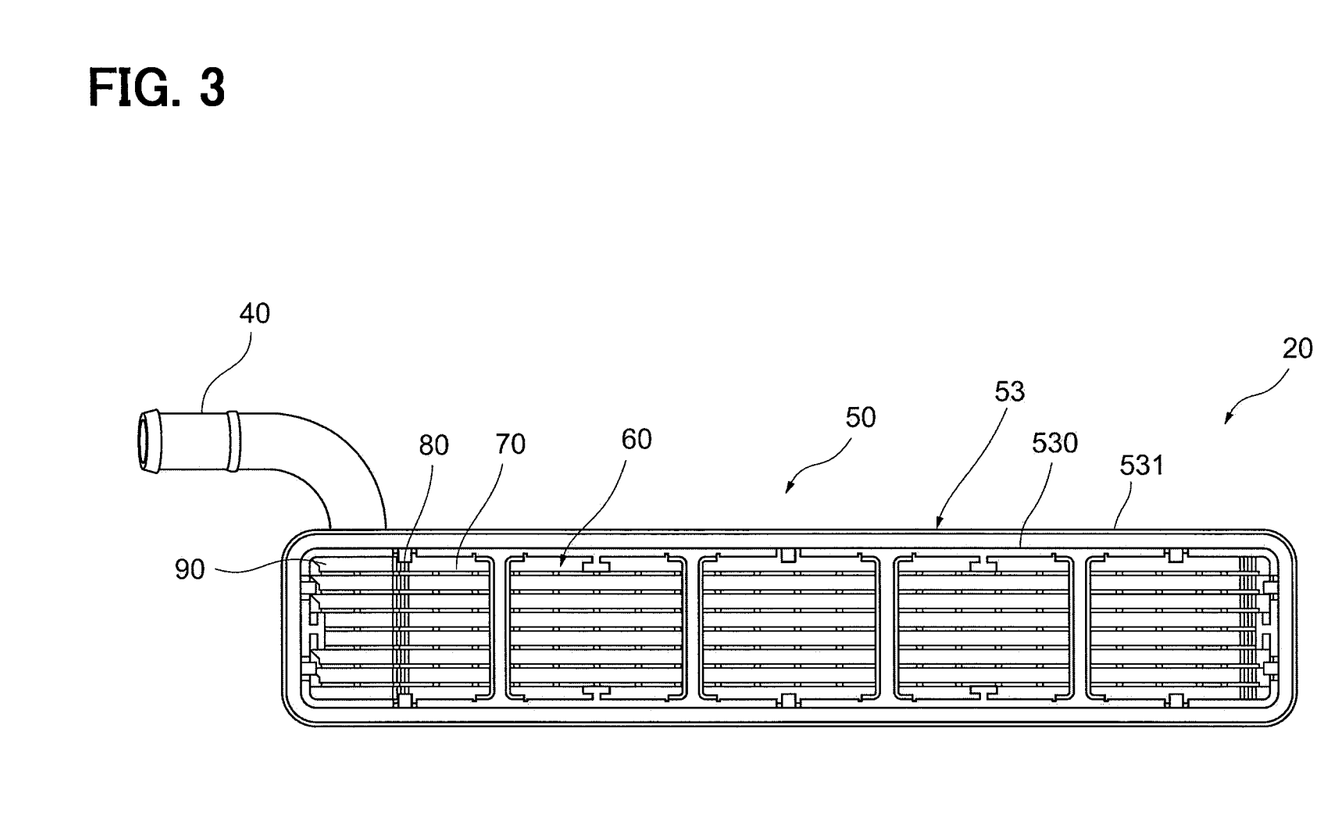
FIG. 3 is a side view illustrating a side structure of a heat exchange unit of the embodiment.
Figure 4:
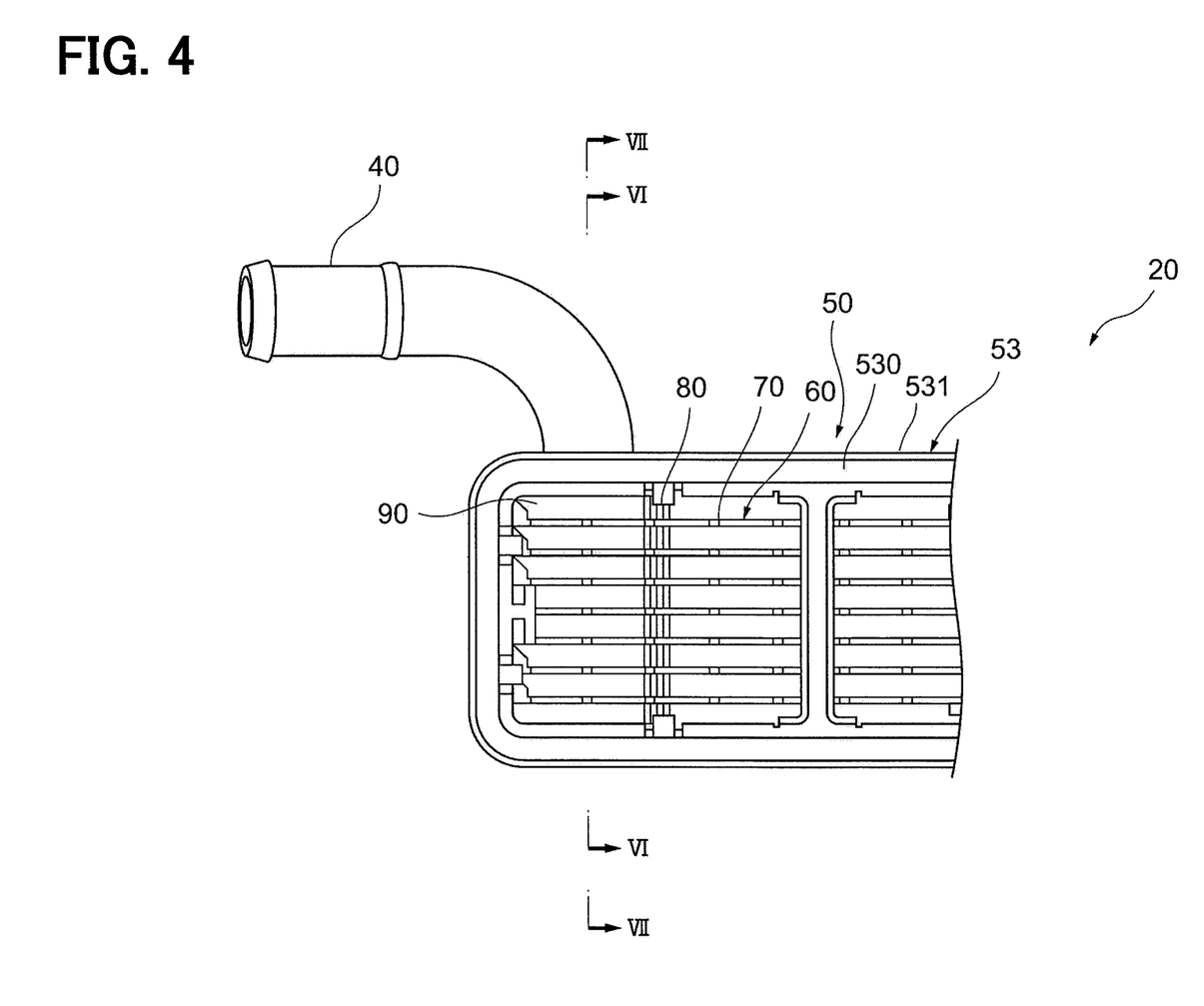
FIG. 4 is an enlarged view illustrating a partially enlarged structure of the side structure of the heat exchange unit of the embodiment.
Figure 5:
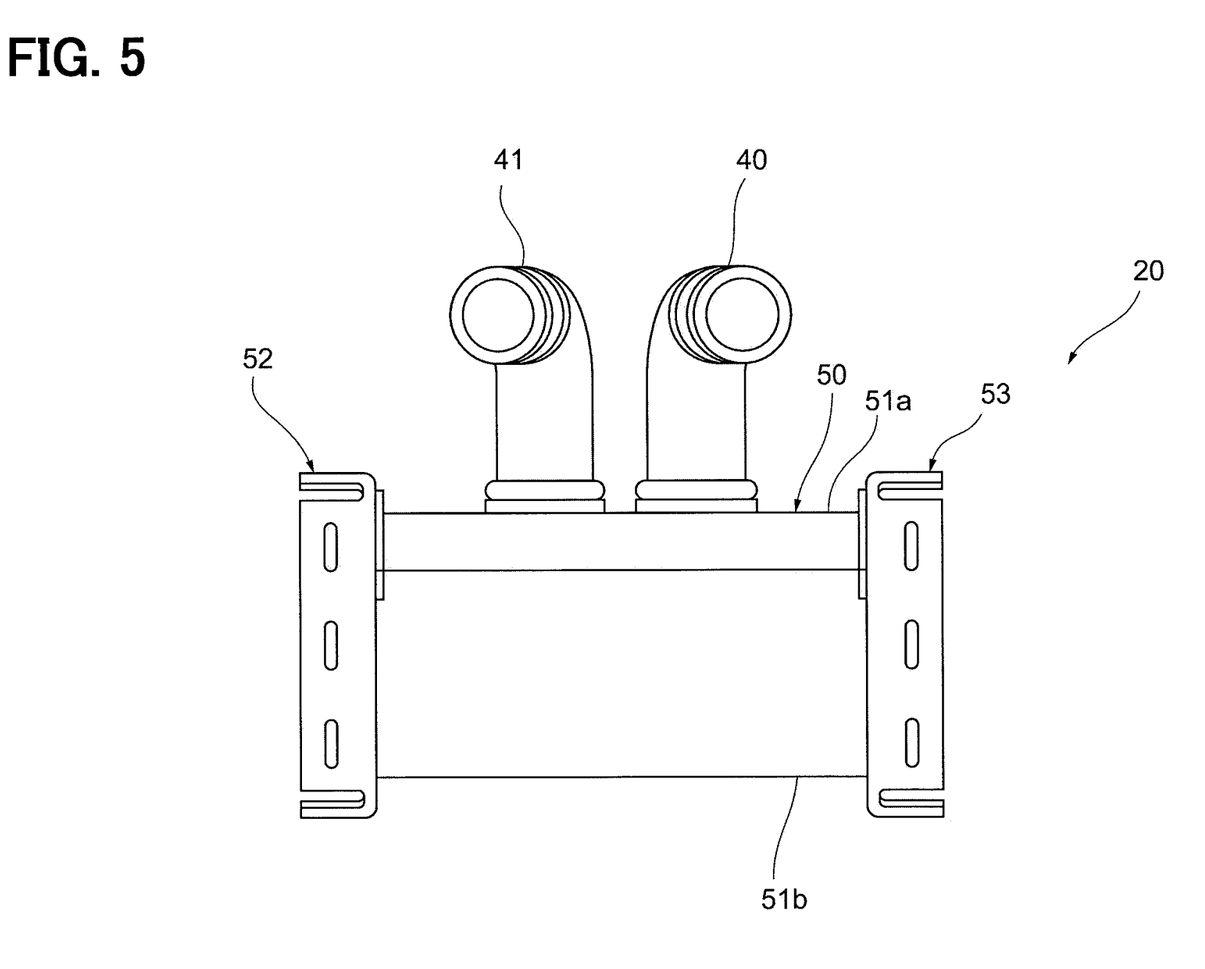
FIG. 5 is a front view illustrating a front structure of the heat exchanger of the embodiment.

As illustrated in FIGS. 3 to 5, the heat exchange unit 20 is formed in a substantially rectangular parallelepiped shape. The heat exchange unit 20 includes a duct plate 50, a heat exchange core portion 60, an inflow-side caulking plate 52, and an outflow-side caulking plate 53. The heat exchange core portion 60 actually performs heat exchange between supercharged air and cooling water. The duct plate 50 is disposed around the heat exchange core portion 60 to introduce supercharged air into the heat exchange core portion 60.

As illustrated in FIG. 5, the duct plate 50 includes an upper duct plate 51a and a lower duct plate 51b that are assembled in a tubular shape. The duct plate 50 is provided surrounding the heat exchange core portion 60. That is, the heat exchange core portion 60 is housed inside the duct plate 50.

Figure 6:
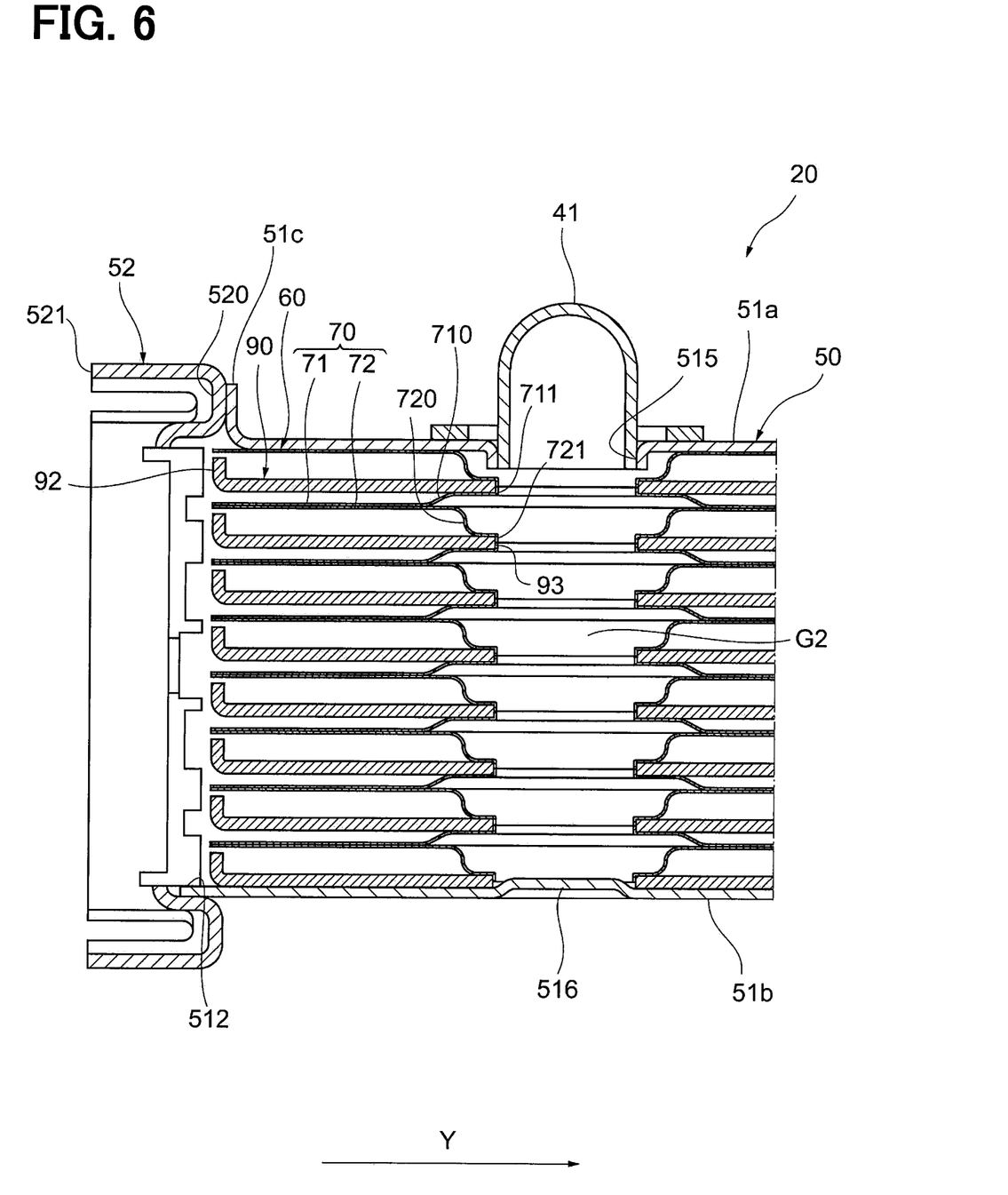
FIG. 6 is a cross-sectional view illustrating a part of a cross-sectional structure taken along line VI-VI in FIG. 4.
Figure 7:
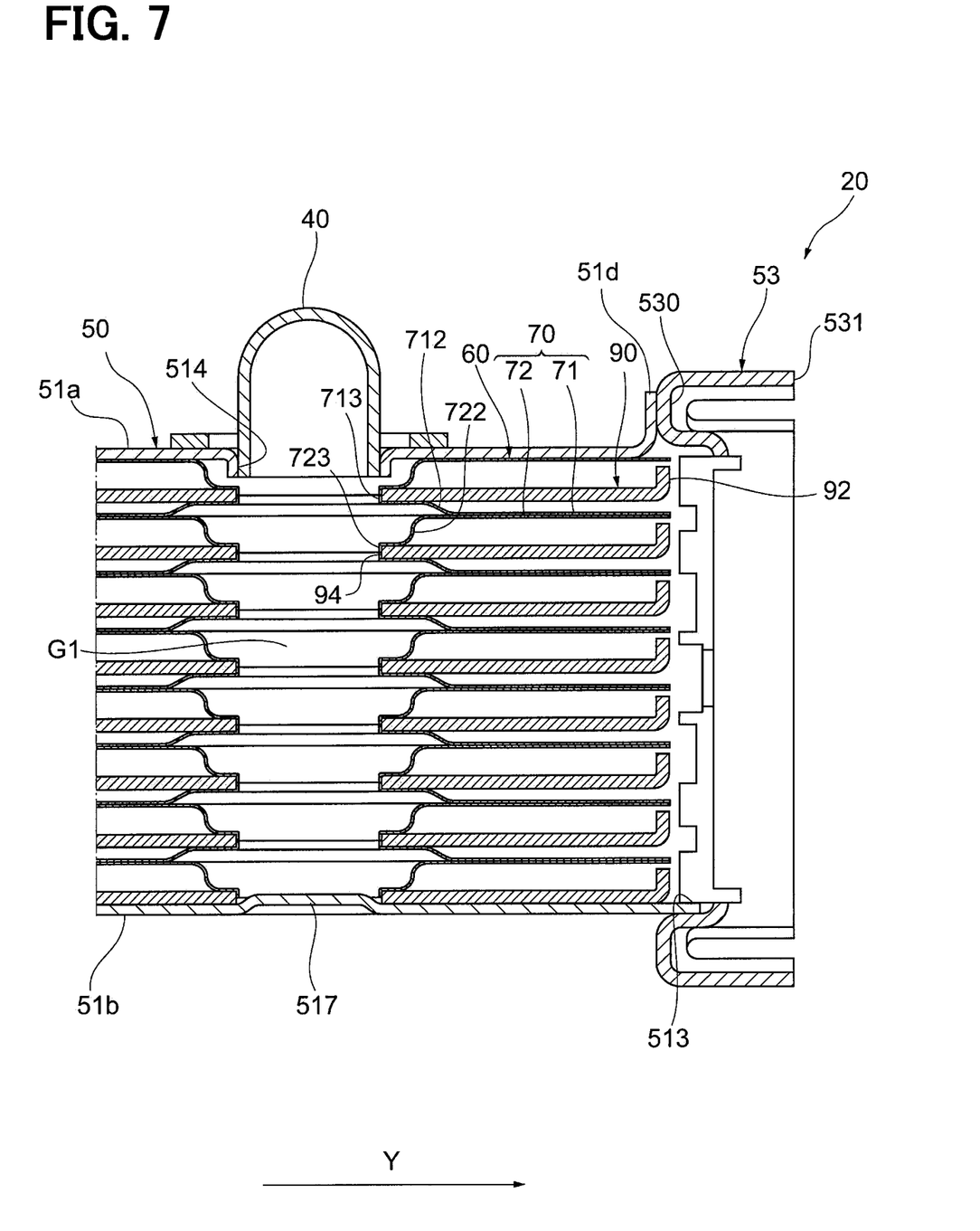
FIG. 7 is a cross-sectional view illustrating a part of a cross-sectional structure taken along line VII-VII in FIG. 4.

As illustrated in FIG. 6, the duct plate 50 is provided on one side portion with an inflow opening 512. The inflow opening 512 is a portion into which supercharged air flows. As illustrated in FIG. 7, the duct plate 50 is provided on the other side portion with an outflow opening 513. The outflow opening 513 is a portion from which supercharged air flows out. That is, in the duct plate 50, supercharged air flows in a direction from the inflow opening 512 to the outflow opening 513, i.e., a direction indicated by arrow Y in each of FIGS. 6 and 7. Hereinafter, the direction indicated by the arrow Y is also referred to as a "flow direction of supercharged air".

As illustrated in FIGS. 6 and 7, the upper duct plate 51a is provided with a cooling water inflow port 514 and a cooling water outflow port 515. The cooling water inflow port 514 is positioned downstream of the cooling water outflow port 515 in a flow direction Y of supercharged air. The cooling water inflow port 514 is connected to the pipe 40 on a cooling water inflow side. The cooling water outflow port 515 is connected to the pipe 41 on a cooling water outflow side. Cooling water flows in the cooling water inflow port 514 through the pipe 40 on a cooling water inflow side. The cooling water having flowed in from the cooling water inflow port 514 flows through the heat exchange core portion 60. The cooling water having passed through the heat exchange core portion 60 flows to the pipe 41 on the cooling water outflow side through the cooling water outflow port 515.

As illustrated in FIG. 6, the inflow-side caulking plate 52 is fixed to an inflow-side flange portion 51c of the upper duct plate 51a and a circumferential edge of the inflow opening 512 of the lower duct plate 51b by brazing or the like to form an inflow port of supercharged air. The inflow-side caulking plate 52 includes a tank sealing portion 520 and a caulking flange portion 521, each of which is in an annular shape with respect to the inflow port. When a packing (not illustrated) is inserted into the tank sealing portion 520, an end of the tank 30 on an inflow side is caulked with the packing interposed therebetween to enable preventing leakage on a supercharged air side and fixing the tank 30 on the inflow side to the heat exchange unit 20.

As illustrated in FIG. 7, the outflow-side caulking plate 53 is fixed to an outflow-side flange portion 51d of the upper duct plate 51a and a circumferential edge of the outflow opening 513 of the lower duct plate 51b by brazing or the like to form an outflow port of supercharged air. The outflow-side caulking plate 53 includes a tank sealing portion 530 and a caulking flange portion 531, each of which is in an annular shape with respect to the outflow port. When a packing (not illustrated) is inserted into the tank sealing portion 530, an end of the tank 31 on an outflow side is caulked with the packing interposed therebetween to enable preventing leakage on a supercharged air side and fixing the tank 31 on the outflow side to the heat exchange unit 20.

As illustrated in FIGS. 3 and 4, the heat exchange core portion 60 includes a plurality of cooling plates 70, a plurality of outer fins 80, and a plurality of spacer plates 90.

The heat exchange core portion 60 has a structure in which the cooling plates 70 and the outer fins 80 are alternately stacked with each other. That is, each of the outer fins 80 is disposed in a predetermined gap formed between the corresponding two adjacent cooling plates 70 and 70. The gap in which each of the outer fins 80 is disposed constitutes a supercharged air flow path through which supercharged air flows. FIGS. 3 and 4 each illustrate the outer fins 80 disposed in only both end portions, and illustration of the outer fins 80 in other portions are eliminated, for convenience. The heat exchange core portion 60 performs heat exchange between cooling water flowing inside each of the cooling plates 70 and supercharged air flowing outside each of the cooling plates 70 to cool the supercharged air. Hereinafter, the stacking direction of the plurality of cooling plates 70 and the plurality of outer fins 80 is also referred to as a "vertical direction", for convenience.

Figure 8:
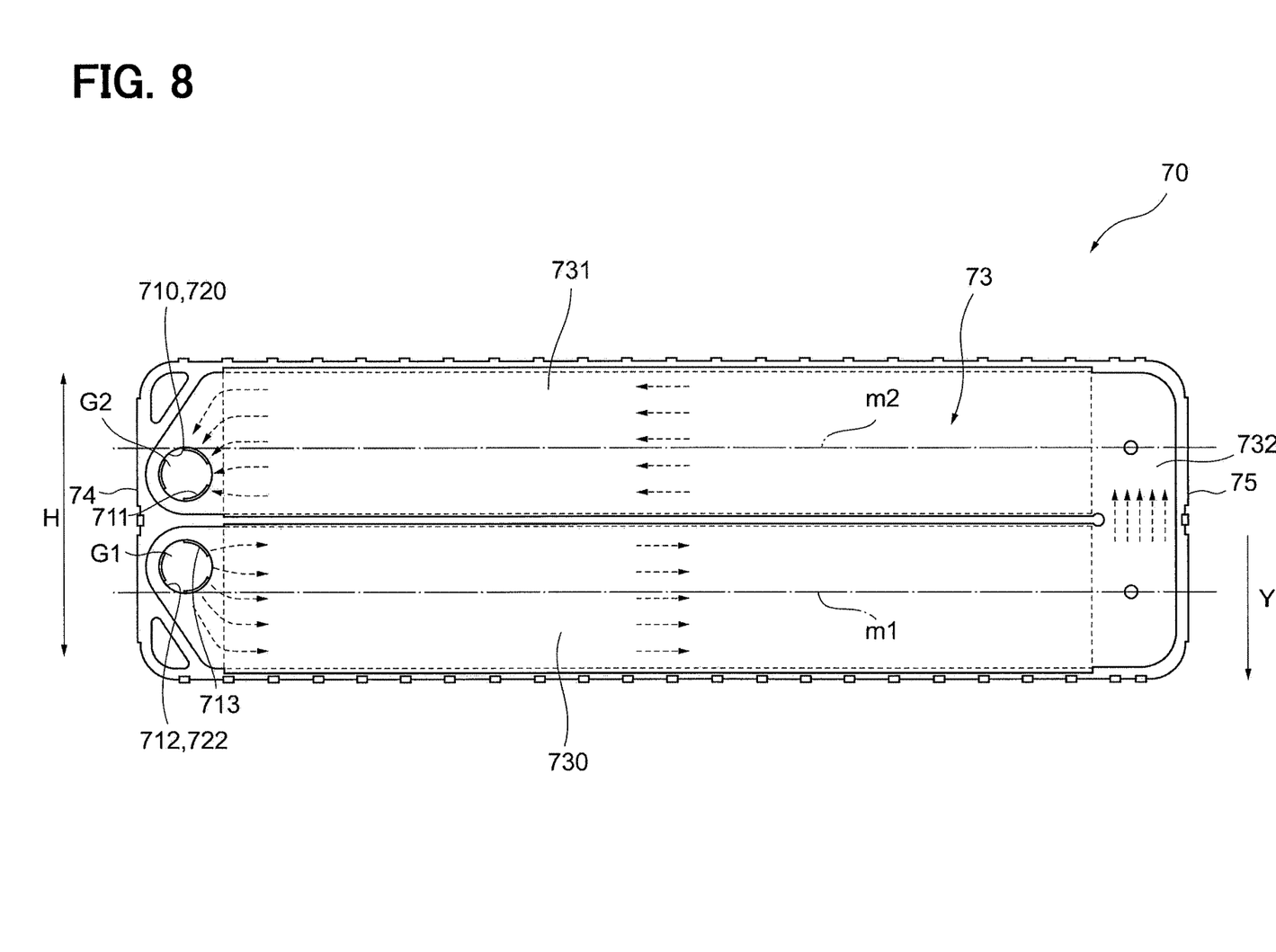
FIG. 8 is a plan view illustrating a planar structure of a cooling plate of the embodiment.

As illustrated in FIGS. 6 and 7, the cooling plates 70 are each formed in a flat shape. The cooling plates 70 each include a pair of plates 71 and 72 bonded to each other. Between the pair of plates 71 and 72, a gap is partially formed. As illustrated in FIG. 8, the gap constitutes a cooling water flow path 73 through which cooling water flows, in the cooling plate 70. Hereinafter, the plate 71 disposed closer to the pipes 40 and 41 of the pair of plates 71 and 72 is also referred to as an "upper plate", for convenience. In addition, the plate 72 disposed farther away from the pipes 40 and 41 of the pair of plates 71 and 72 is also referred to as a "lower plate".

Figure 9:
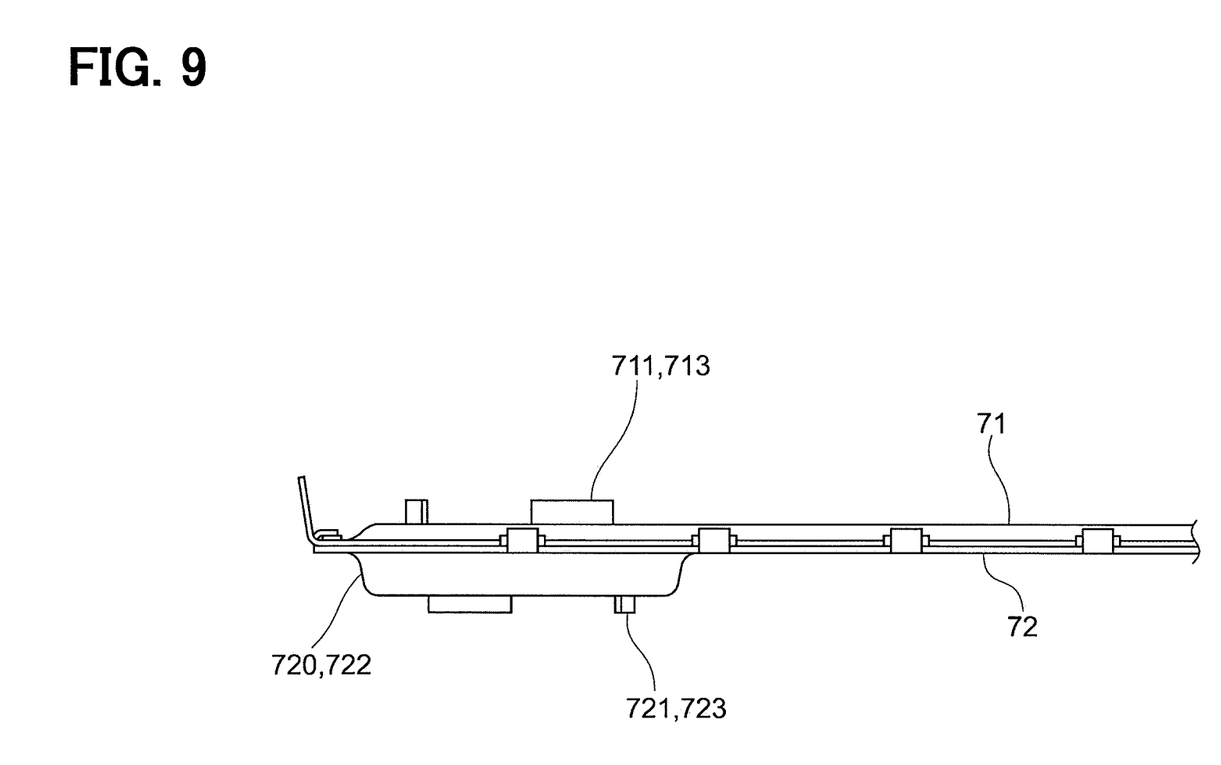
FIG. 9 is an enlarged side view illustrating a side structure around a cup portion of the cooling plate of the embodiment.

As illustrated in FIG. 7, a through hole 712 is formed in a portion of the upper plate 71, the portion facing the cooling water inflow port 514 of the upper duct plate 51a. As illustrated in FIG. 9, a burring portion 713 projecting upward is formed in an inner peripheral portion of the through hole 712. As illustrated in FIG. 6, a through hole 710 is formed in a portion of the upper plate 71, the portion facing the cooling water outflow port 515 of the upper duct plate 51a. As illustrated in FIG. 9, a burring portion 711 projecting upward is also formed in an inner peripheral portion of the through hole 710.

As illustrated in FIG. 7, an inflow-side cup portion 722 projecting downward in a cylindrical shape is formed in a portion of the lower plate 72, the portion facing the cooling water inflow port 514 of the upper duct plate 51a. The inflow-side cup portion 722 allows cooling water to flow into the cooling water flow path 73 of the cooling plate 70. As illustrated in FIG. 9, a burring portion 723 is formed projecting from an opening portion at a leading end of the inflow-side cup portion 722. In addition, as illustrated in FIG. 6, an outflow-side cup portion 720 projecting downward in a cylindrical shape is formed in a portion of the lower plate 72, the portion facing the cooling water outflow port 515 of the upper duct plate 51a. The outflow-side cup portion 720 allows cooling water having flowed through the cooling water flow path 73 of the cooling plate 70 to flow out. As illustrated in FIG. 9, a burring portion 721 is formed projecting from an opening portion at a leading end of the outflow-side cup portion 720.

As illustrated in FIG. 7, the burring portion 723 provided in the inflow-side cup portion 722 of the burring portions is caulked and fixed to a through hole 94 of each of the spacer plates 90. When the burring portion 713 provided in the through hole 712 of the upper plate 71 is inserted into the through hole 94 of each of the spacer plates 90, described above, the cooling water flow paths (the through holes 712 and the cup portions 722) of the plurality of cooling plates 70 stacked can be stacked coaxially with each other.

The through holes 712 of the respective cooling plates 70 and the inflow-side cup portion 722 communicate with each other to form a distribution space G1. The distribution space G1 communicates with not only the cooling water inflow port 514 of the upper duct plate 51*a*, but also the cooling water flow path 73 of each of the cooling plates 70. That is, cooling water having flowed into the heat exchange core portion 60 from the pipe 40 on the cooling water inflow side through the cooling water inflow port 514 of the upper duct plate 51*a* is distributed to the cooling water flow path 73 of each of the cooling plates 70 through the distribution space G1.

As illustrated in FIG. 6, the burring portion 721 provided in the outflow-side cup portion 720 of the burring portions is caulked and fixed to a through hole 93 of each of the spacer plates 90. When the burring portion 711 provided in the through hole 710 of the upper plate 71 is inserted into the through hole 93 of each of the spacer plates 90, described above, the cooling water flow paths (the through holes 710 and the cup portions 720) of the plurality of cooling plates 70 stacked can be stacked coaxially with each other.

The through holes 710 of the respective cooling plates 70 and the outflow-side cup portion 720 communicate with each other to form a collective space G2. The collective space G2 communicates with not only the cooling water outflow port 515 of the upper duct plate 51*a*, but also the cooling water flow path 73 of each of the cooling plates 70. That is, the cooling water having flowed through the cooling water flow path 73 of each of the cooling plates 70 is once collected in the collective space G2, and then flows out to the pipe 41 on the cooling water outflow side through the cooling water outflow port 515 of the upper duct plate 51*a*.

As illustrated in FIGS. 6 and 7, the spacer plates 90 are each formed in a plate shape. Each of the spacer plates 90 is provided at both ends in the flow direction Y of supercharged air with respective blocking walls 92 formed being bent upward. No outer fin 80 is disposed in portions where the blocking walls 92 are disposed. The blocking walls 92 each prevent an inflow of supercharged air to a portion where the outer fin 80 is not disposed to enhance cooling efficiency of the supercharged air.

As illustrated in FIGS. 6 and 7, the through holes 93 and 94 of the spacer plate 90 disposed at the lowermost stage are closed by being fitted with projecting portions 516 and 517, respectively, formed in the lower duct plate 51*b*.

As illustrated in FIG. 8, the cooling water flow path 73 formed inside the cooling plate 70 has a first flow path portion 730, a second flow path portion 731, and a U-turn portion 732.

The first flow path portion 730 is formed extending from one end 74 where the through hole 712 and the inflow-side cup portion 722 are formed toward the other end 75 in the cooling plate 70. The first flow path portion 730 communicates with the distribution space G1 through the through hole 712 and the inflow-side cup portion 722. The second flow path portion 731 is formed extending from the one end 74 where the through hole 710 and the outflow-side cup portion 720 are formed toward the other end 75 in the cooling plate 70. The second flow path portion 731 communicates with the collective space G2 through the through hole 710 and the outflow-side cup portion 720. The first flow path portion 730 and the second flow path portion 731 are formed extending in a direction perpendicular to the flow direction Y of supercharged air.

The first flow path portion 730 and the second flow path portion 731 communicate with each other in the U-turn portion 732 at the other end 75 of the cooling plate 70. The U-turn portion 732 is formed being bent in a U-shape.

As illustrated in FIG. 8 by arrows of broken lines, cooling water flows from the distribution space G1 into the first flow path portion 730, and the cooling water flows into the second flow path portion 731 through the U-turn portion 732, in the cooling plate 70. The cooling water having flowed through the second flow path portion 731 flows into the collective space G2.

Figure 11:
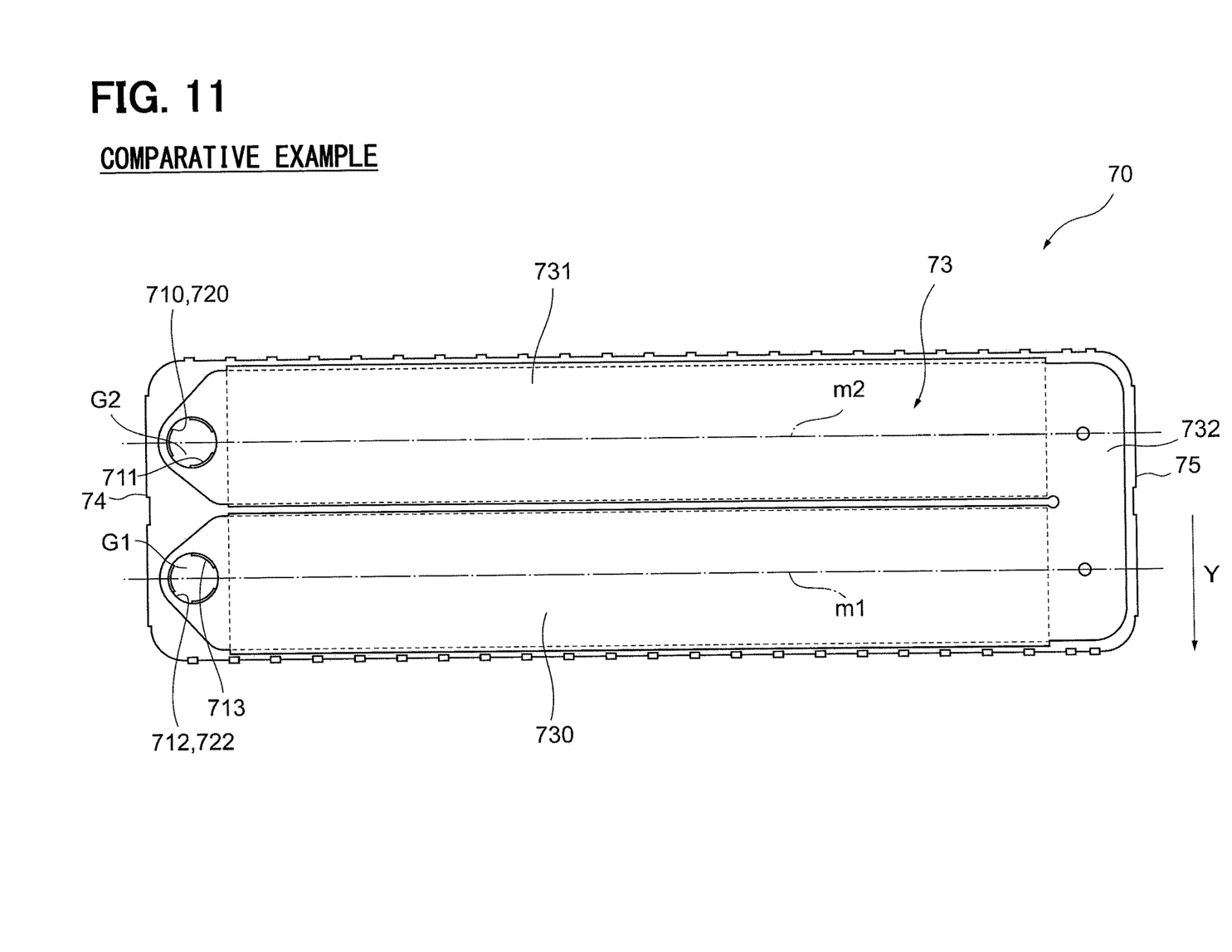
FIG. 11 is a plan view illustrating a planar structure of a cooling plate of a comparative example.
Figure 12:
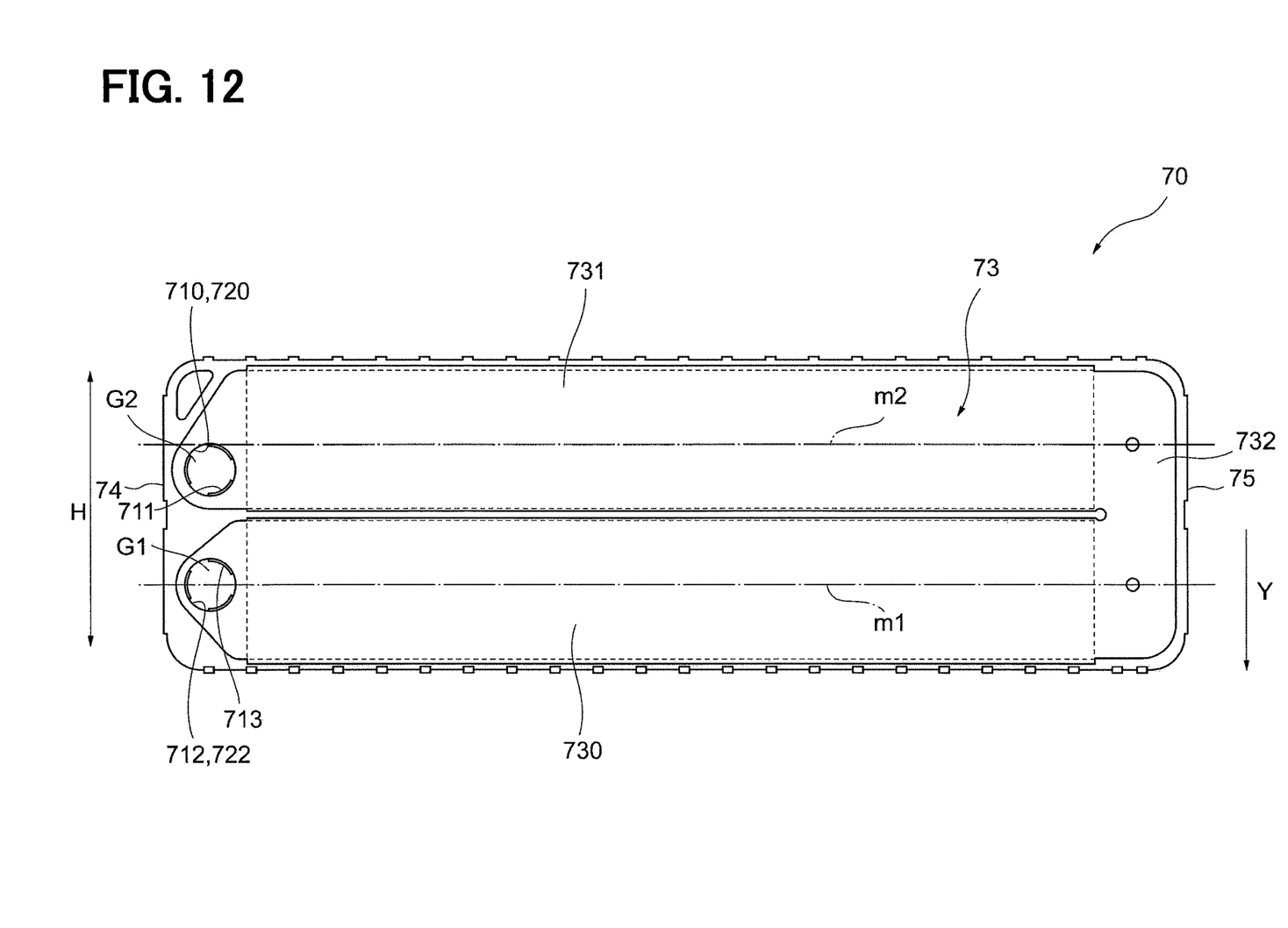
FIG. 12 is a plan view illustrating a planar structure of a cooling plate of another embodiment.

When a direction perpendicular to the flow direction of the cooling water in the first flow path portion 730 and the second flow path portion 731 is defined as a flow path width direction H, axes m1 and m2 in each of FIGS. 8, 11, and 12 indicate the center of the first flow path portion 730 in the flow path width direction H and the center of the second flow path portion 731 in the flow path width direction H, respectively. Thus, the through hole 712 and the inflow-side cup portion 722 are each disposed at a position offset from the center m1 of the first flow path portion 730 toward an upstream side of the flow direction of supercharged air. In addition, the through hole 710 and the outflow-side cup portion 720 are each disposed at a position offset from the center m2 of the second flow path portion 731 toward a downstream side of the flow direction Y of supercharged air.

Next, an operation example of the heat exchanger 13 of the present embodiment will be described.

In the heat exchanger 13 of the present embodiment, supercharged air flows from the tank 30 on the inflow side through the inflow port of the inflow-side caulking plate 52 to be introduced into the inside of the duct plate 50 composed of the upper duct plate 51*a* and the lower duct plate 51*b*. This supercharged air passes through a gap between the cooling plates 70 and 70, i.e., the heat exchange core portion 60 in which the outer fins 80 are disposed, and flows into the tank 31 on the outflow side.

In addition, cooling water flows into the heat exchange core portion 60 through the pipe 40 on the cooling water inflow side. Specifically, the cooling water having flowed into the heat exchange core portion 60 from the pipe 40 on the cooling water inflow side is distributed to the cooling water flow path 73 of each of the cooling plates 70 through the distribution space G1. The cooling water distributed to the cooling water flow paths 73 of the respective cooling plates 70 sequentially flows through the first flow path portion 730, the U-turn portion 732, and the second flow path portion 731, to be collected in the collective space G2. Outside the cooling plate 70, supercharged air flows in the direction indicated by the arrow Y. Thus, supercharged air is cooled by absorbing heat of the supercharged air when cooling water flows through the first flow path portion 730, the U-turn portion 732, and the second flow path portion 731. The cooling water collected in the collective space G2 is discharged to the outside through the pipe 41 on the cooling water outflow side.

Figure 10:
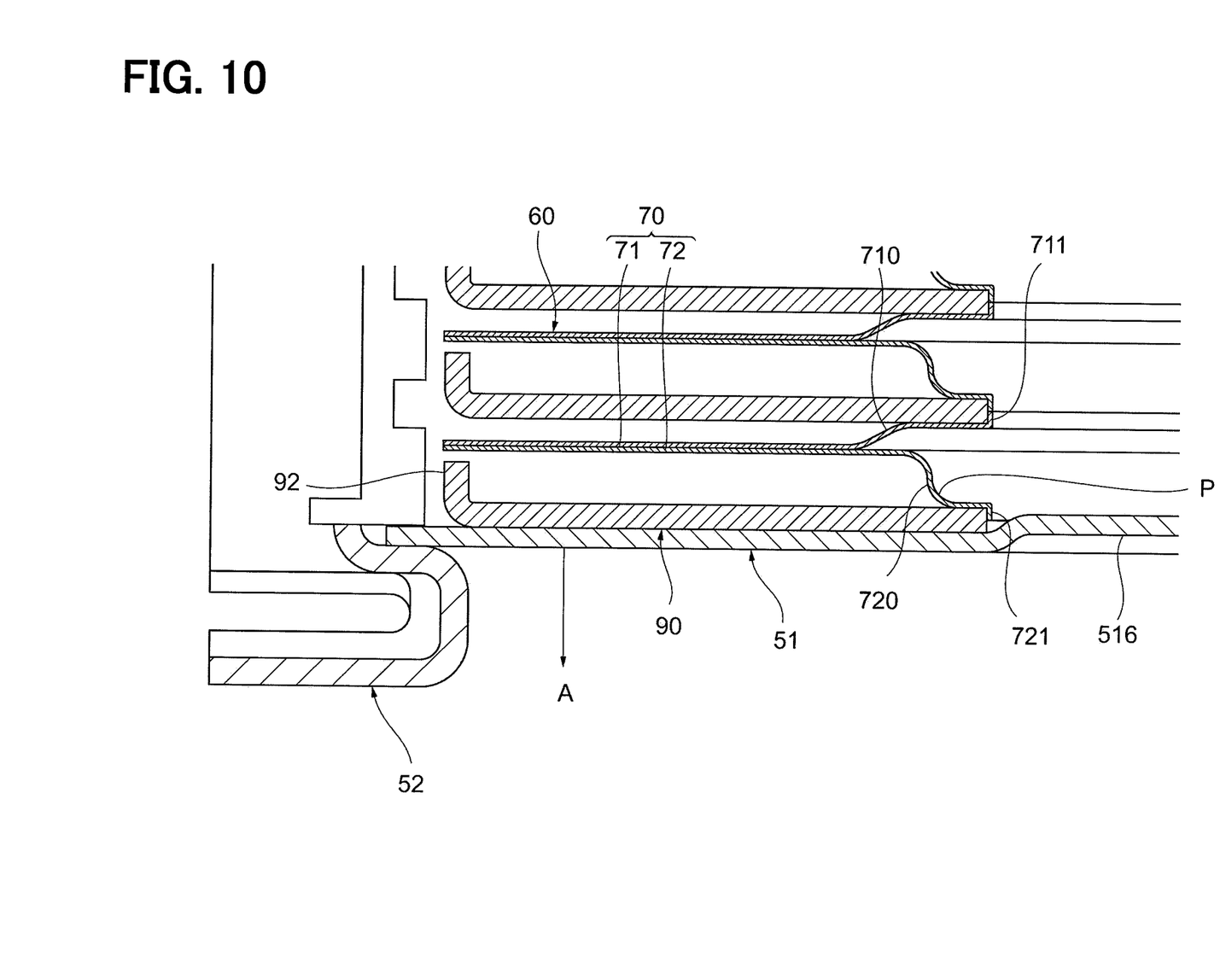
FIG. 10 is a cross-sectional view illustrating a partial cross-sectional structure of the heat exchange unit of the embodiment.

In the heat exchanger 13 of this embodiment, the duct plate 50, and the caulking plates 52 and 53, are likely to be deformed due to heat of supercharged air and internal pressure. Particularly, the inflow-side caulking plate 52, the upper duct plate 51*a*, and the lower duct plate 51*b*, along which supercharged air at high temperature flows, are likely to be deformed. When the inflow-side caulking plate 52 is deformed in the direction indicated by the arrow A as illustrated in FIG. 10, the duct plate 50 and the spacer plate 90 are structurally pulled due to the deformation of the inflow-side caulking plate 52. Then, excessive distortion occurs at a portion P of the outflow-side cup portion 720 of the cooling plate 70 bonded to the duct plate 50 and the spacer plate 90. Likewise, the inflow-side cup portion 722 of the cooling plate 70 may be distorted when the outflow-side caulking plate 53 is deformed. However, temperature of a supercharger is lower than that on the inflow side, so that occurring distortion tends to decrease.

On this point, the heat exchanger 13 of the present embodiment is configured such that the outflow-side cup portion 720 is formed in a cylindrical shape having a central axis at a position shifted downstream of the center m2 of the second flow path portion 731 in the flow direction of supercharged air, as illustrated in FIG. 8. Accordingly, the outflow-side cup portion 720 of the present embodiment is disposed farther away from the inflow-side caulking plate 52 as compared with when the outflow-side cup portion 720 is formed having a central axis aligning with the center m2 of the second flow path portion 731 as illustrated in FIG. 11. Thus, even when the inflow-side caulking plate 52 is deformed due to heat of supercharged air, distortion occurring in the outflow-side cup portion 720 can be reduced. As a result, durability of the outflow-side cup portion 720 can be improved.

According to the heat exchanger 13 of the present embodiment described above, actions and effects described in the following items (1) to (4) can be obtained.

(1) The outflow-side cup portion 720 is formed in a cylindrical shape having a central axis at a position offset from the center m2 of the second flow path portion 731 toward a downstream side of the flow direction of supercharged air. Accordingly, distortion occurring in the outflow-side cup portion 720 can be reduced, so that durability of the outflow-side cup portion 720 can be improved.

(2) The inflow-side cup portion 722 is formed in a cylindrical shape having a central axis at a position offset from the center m1 of the first flow path portion 730 toward an upstream side of the flow direction of supercharged air. Accordingly, even when the outflow-side caulking plate 53 is deformed due to heat of supercharged air, distortion occurring in the inflow-side cup portion 722 can be reduced to enable durability of the inflow-side cup portion 722 to be improved.

(3) When the heat exchange unit 20 includes the heat exchange core portion 60, the duct plate 50, the inflow-side caulking plate 52, and the outflow-side caulking plate 53, having a structure in which the cooling plate 70 and the duct plate 50 are bonded, and the duct plate 50 is bonded to the inflow-side caulking plate 52 and the outflow-side caulking plate 53, the inflow-side caulking plate 52 and the outflow-side caulking plate 53 are likely to be deformed due to heat of supercharged air. This causes the cup portions 720 and 722 to be likely to be distorted in the structure of the heat exchanger 13. Thus, the structure in which the cup portions 720 and 722 are disposed as in the present embodiment is particularly effective.

(4) The heat exchanger 13 further includes the spacer plate 90 fixed to the lower duct plate 51*b* and the cooling plate 70, and the spacer plate 90 prevents an inflow of supercharged air to a portion other than the outer fins 80. When the heat exchanger 13 includes the spacer plate 90 as described above, the cup portions 720 and 722 are likely to be distorted when the inflow-side caulking plate 52 and the outflow-side caulking plate 53 are deformed due to heat of supercharged air. Thus, the structure in which the cup portions 720 and 722 are disposed as in the present embodiment is particularly effective.

In addition, the embodiment above can also be implemented with the following forms.

As illustrated in FIG. 12, the inflow-side cup portion 722 may be positioned on the center m1 of the first flow path portion 730 in the flow path width direction. Even this structure enables the actions and effects described in the item (1) above to be obtained.

The shape of the cooling water flow path 73 of the cooling plate 70 is not limited to the U shape, and can be changed as appropriate. The shape of the cooling water flow path 73 may be linear, for example. In the cooling plate 70 as described above, the inflow-side cup portion is disposed at one end thereof, and the outflow-side cup portion is disposed at the other end. In this case, the inflow-side cup portion and the outflow-side cup portion may be each formed in a cylindrical shape having a central axis at a position shifted downstream of the center of the flow path portion in the flow direction of supercharged air.

The heat exchanger 13 may have a structure without the spacer plate 90. In the heat exchanger 13 having the structure as described above, even when the cup portions 720 and 722 of the cooling plate 70 disposed at the lowermost stage are bonded to the duct plate 50, disposing the cup portions 720 and 722 as in the above embodiment enables durability of the cup portions 720 and 722 to be improved.

The shape of the cup portions 720 and 722 is not limited to the cylindrical shape, and can be changed to any tubular shape such as a square tubular shape.

The present disclosure is not limited to the above specific examples. As far as having a feature of the present disclosure, a modification in which a person skilled in the art appropriately makes a design change to these specific examples is included in the scope of the present disclosure. Each element included in the specific examples described above, and placement, conditions, shape, and the like of each element are not limited to those illustrated, and can be changed as appropriate. Each element included in the specific examples described above can be appropriately changed in combination as long as no technical contradiction arises.

The invention claimed is:

1. A heat exchanger comprising:
 a plurality of cooling plates that are stacked with each other with gaps, each of the plurality of cooling plates defining a cooling water flow path therein through which cooling water flows;
 a duct plate that is disposed around the plurality of cooling plates, the duct plate defining an inflow opening into which supercharged air flows and an outflow opening from which the supercharged air flows out; and
 a spacer plate that is fixed to both the duct plate and a first cooling plate to prevent supercharged air from flowing into a gap between the duct plate and the first cooling plate, wherein
 the plurality of cooling plates include a plurality of coupling portions that are fixed to the plurality of cooling plates to cause the cooling water flow paths of the plurality of cooling plates to be in communication with each other,
 the cooling water flow path of each of the plurality of cooling plates includes a flow path portion extending from a respective one of the plurality of coupling portions along a direction perpendicular to a flow direction of the supercharged air,
 a direction perpendicular to a flow direction of the cooling water in the flow path portion is defined as a flow path width direction, each of the plurality of coupling portions is formed into a tubular shape having a central axis at a position offset along the flow direction of the supercharged air from a center of the flow path portion in the flow path width direction; and the spacer plate is provided, at both ends thereof, with blocking walls that are formed by bending the both ends.

2. The heat exchanger according to claim 1, wherein the flow path portion includes:
- a first flow path portion that is positioned closer to the outflow opening of the duct plate than the inflow opening of the duct plate; and
- a second flow path portion that is positioned closer to the inflow opening of the duct plate than the outflow opening of the duct plate, each of the plurality of coupling portions includes:
- an inflow-side coupling portion for allowing cooling water to flow into the first flow path portion; and
- an outflow-side coupling portion for allowing the cooling water having flowed through the second flow path portion to flow out, and the outflow-side coupling portion is formed into a tubular shape having a central axis at a position offset from a center of the second flow path portion in the flow path width direction toward a downstream side of the flow direction of the supercharged air.

3. The heat exchanger according to claim 2, wherein the inflow-side coupling portion formed into a tubular shape having a central axis at a position offset from a center of the first flow path portion in the flow path width direction toward an upstream side of the flow direction of the supercharged air.

4. The heat exchanger according to claim 1, wherein the duct plate includes an upper duct plate and a lower duct plate, the heat exchanger further comprises:
- an inflow-side plate that is fixed to the inflow opening by brazing, an inflow tank for introducing the supercharged air into the duct plate being fixed to the inflow-side plate; and
- an outflow-side plate that is fixed to the outflow opening by brazing, an outflow tank for discharging the supercharged air having passed through the duct plate being fixed to the outflow-side plate.

* * * * *